J. Eralle,
Sharpening Reciprocating Saws.
N° 18,684. Patented Nov. 24, 1857.
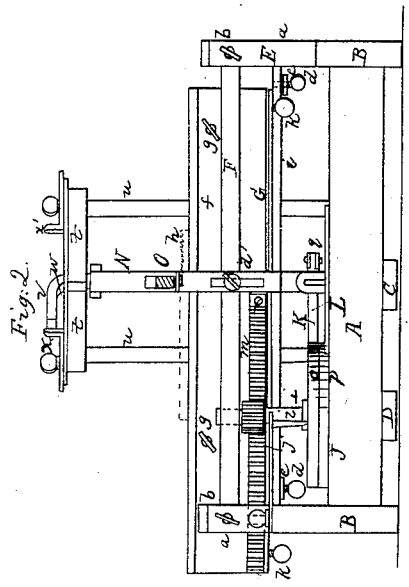
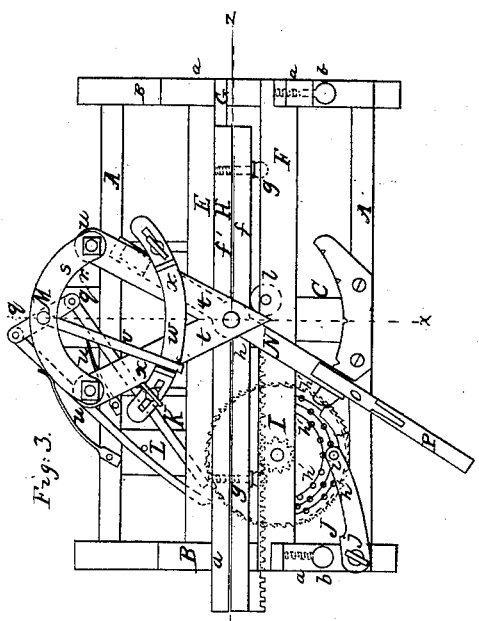
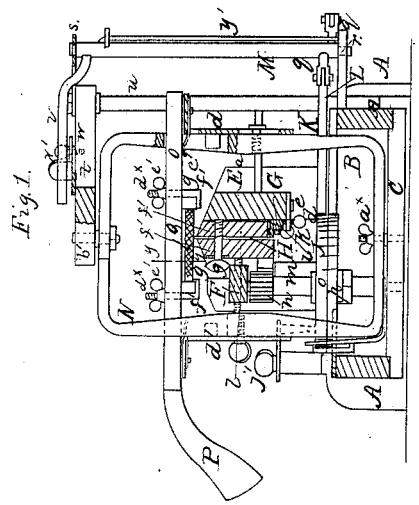
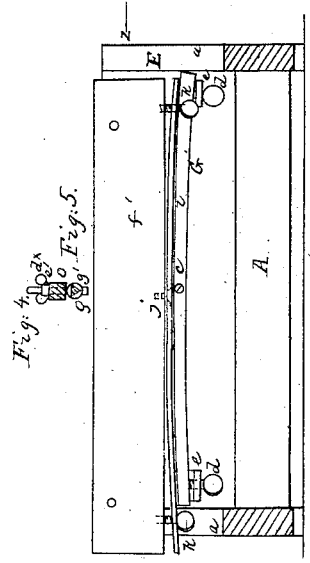

UNITED STATES PATENT OFFICE.

JACOB ERDLE, OF WEST BLOOMFIELD, NEW YORK.

MACHINE FOR FILING SAWS.

Specification of Letters Patent No. 18,684, dated November 24, 1857.

*To all whom it may concern:*

Be it known that I, JACOB ERDLE, of West Bloomfield, in the county of Ontario and State of New York, have invented a new and Improved Implement or Device for Filing Saws; and I do hereby declare that the following is a full, clear, and exact description of the same, reference being had to the annexed drawings, making a part of this specification, in which—

Figure 1, is a transverse vertical section of my improvement; (*x*), (*x*), Fig. 3, indicating the plane of section. Fig. 2 is a side view of ditto. Fig. 3 is a plan or top view of ditto. Fig. 4 is a transverse section of the file frame; (*y*), (*y*), Fig. 1 indicating the plane of section. Fig. 5 is a longitudinal vertical section of ditto; (*z*), (*z*), Fig. 3 showing the plane of section.

Similar letters of reference indicate corresponding parts in the several figures.

The object of this invention is to enable inexperienced persons, apprentices, etc., to file saws in an expeditious and perfect manner. The proper filing of a saw cannot be accomplished manually by an unpracticed hand. Considerable practice is necessary in order to keep the teeth regular and of a uniform size.

The above object is obtained and the invention therefore consists in the peculiar means employed for feeding the saw to the file and in a peculiar arrangement of the clamp which holds or grasps the saw, also in a novel arrangement of the file, the whole being constructed as will be hereinafter fully shown and described whereby the same may be fed with accuracy to the file and properly presented to it and the file also adjusted with the greatest facility so as to cut in the desired direction relatively with the plane of the saw.

To enable those skilled in the art to make and use my invention I will proceed to describe its construction and the manner in which it is used.

A, A, represent two parallel bars, the ends of which are secured to cross ties or heads B, B, and C, D, are two cross pieces which are attached to the bars A, A. On each cross-tie or head B two parallel uprights (*a*) (*a*) are secured, and the ends of parallel bars E, F, are attached to the uprights (*a*) (*a*) one to each. The bar E is permanently attached to two of the uprights, but the other bar F has its ends fitted in slots or recesses in the upper ends of the uprights (*a*) (*a*) said bar being allowed to slide laterally in and out in said recesses and adjusted by thumb screws (*b*) (*b*).

To the lower part of the bar E, and to its inner side, a metallic bar G is secured by a pivot (*c*) the pivot passing through the center of the bar G as shown clearly in Fig. 5. This bar G is of curved form as shown clearly in Fig. 5 and a thumb screw (*d*) passes through a plate (*e*) at each end of the bar G said screws bearing against the ends of the bar E. By adjusting these screws a greater or less curvature may be given the bar G.

H represents a clamp which is formed of the bars (*f*) (*f'*) connected by thumb screws (*g*) (*g*). The saw (*h*) to be filed, shown in red, is secured or clamped between these bars (*f*) (*f'*). To the under side of the bar (*f'*) a bar (*i*) is attached by a bolt (*j*) the bolt (*j*) passing through the center of the bar (*i*). Through each end of the bar (*i*) a thumb screw (*k*) passes, and these screws bear against the under surface of the bar (*f'*). By adjusting the screws (*k*) the bar (*i*) may be curved more or less to correspond with the bar G and a curvilinear motion, will be given the clamp and saw as they are moved in either direction.

In the bar F a friction roller (*l*) is fitted. This roller bears against the bar (*f*) and is intended to diminish friction.

To the lower part of the bar (*f*) and at its outer side a rack (*m*) is attached, see Figs. 1 and 2, and a pinion (*n*) gears into this rack. The pinion (*n*) is placed on the upper end of an arbor I, said arbor having a wheel J on it, the periphery of which has two sets of ratchet teeth (*o*) (*p*) formed on it, one set being above the other and one set cuts in a reverse direction to the other one set being for a pulling and the other for a shoving pawl.

K represents the pulling pawl which catches into the upper set of teeth (*o*) and L is the shoving pawl which catches into the lever teeth (*p*). These pawls are both connected to horizontal arms (*q*) on a vertical shaft M the lower end of which is stepped in a plate (*r*) which projects from one of the bars A. The upper end of the shaft works in a segment plate (*s*) the ends of which are attached to horizontal bars (*t*) secured to the upper ends of uprights (*u*) (*u*) the lower ends of which are attached to the same bar A as the plate (r). To the upper end of the shaft M a lever (v) is attached, said lever traversing over the end of a segment bar (w) which is provided with two adjustable stops (x') for the purpose of controlling the length of its movement. A spring (y') is attached to the shaft M, the use of which will be presently shown.

N represents a vertical frame the lower end of which works on a pivot (a<sup>x</sup>) at the center of the cross-piece C. The upper end of the frame N has a pivot (b') attached, said pivot serving as the top center of the frame N. The frame N is allowed to turn freely on its centers. Through the frame N a bar O passes. This bar passes through slots in the frame and rests upon springs (c') which are attached to adjustable rests or supports (d') (d') secured to the frame N. The outer end of the bar O has a handle P attached and two screw rods (d<sup>x</sup>) (d<sup>x</sup>) pass through the bar O. The upper ends of the rods (d<sup>x</sup>) have each a nut (e') on them and the lower ends have lips (f') attached in which cylindrical sockets (g') are fitted and clamped between the lips (f') and the bar O by turning the nuts (e'). The ends of a file Q are fitted in the sockets (g') and the sides of the file are parallel with each other.

The upper surface of the wheel J has a series of concentric circles formed on it in which holes (h') are formed, and a pivot (i') which is attached to a plate (j') fits in a hole at the termination of each movement of the wheel.

The operation is as follows: The saw (h) to be filed is clamped between the bars (f) (f') and if its teeth are perfectly in line with each other the bars G (i) are by turning the thumb screws (d) (d) (k) (k) brought perfectly straight or horizontal. The stops (x') (x') on the plate (w) are then adjusted so that when the end of the lever (v) is moved over the space between them the clamp and saw will be moved the distance of the teeth, and the pivot (i') is adjusted over the proper circle of holes so that it will catch into a hole at the termination of each movement of the lever (v). The saw (h) is thereby fed along the operation actuating the lever (v) as each tooth is filed. The bar O is drawn back and forth by hand, and by adjusting the stops (d') the file may be made to cut the desired depth according to the size of the teeth. The springs (c') serve to elevate the file when the bar O is relieved from the pressure of the hand. When every alternate tooth has been filed the pulling pawl K is thrown out free from the teeth (o) and the shoving pawl (p) is allowed to catch into the lever teeth (b)—by this means the movement of the clamp and saw is reversed and the intermediate teeth are filed. The position of the file Q is also reversed by turning the frame N so that the file may have the proper relative position with the saw, the frame being retained in proper position by a catch.

In many cases the cutting edges of saws are rounding, the teeth being out of line with each other. In such cases the bars G (i) are bent or curved by adjusting or turning the screws (d) (k) and the clamp and saw will consequently be moved in a curvilinear manner corresponding to the curved line of the teeth, the bars G (i) being curved accordingly, and the movement of the saw will therefore be adapted to the gage of the file.

By this implement the saw may be filed in an even and perfect manner by an inexperienced person. The implement may be cheaply constructed, there are no parts liable to get out of repair, and different saws having different sized teeth may be filed by the same machine.

Having thus described my invention, what I claim as new, and desire to secure by Letters-Patent, is:

1. The two adjustable or elastic bars G (i) attached one to the permanent bar E and the other to the bar (f') of the clamp, and arranged as shown, whereby the movement of the saw may be fed to the file in a horizontal or curved direction corresponding to the form of its cutting edge or to the line of its teeth as described.

2. I claim placing the file bar O within the frame N pivoted or hung as described, so that the position of the file may be changed relatively with the saw as described.

3. I claim the arrangement of the lever (v) shaft M, pawls K, L, wheel J, provided with ratchet teeth (o) (p) as shown, and the pinion (n) and rack (m) whereby the saw is fed to the file in either direction as herein described.

JACOB ERDLE.

Witnesses:
H. N. CRANDALL,
JAS. H. HALL.